Patented May 8, 1951

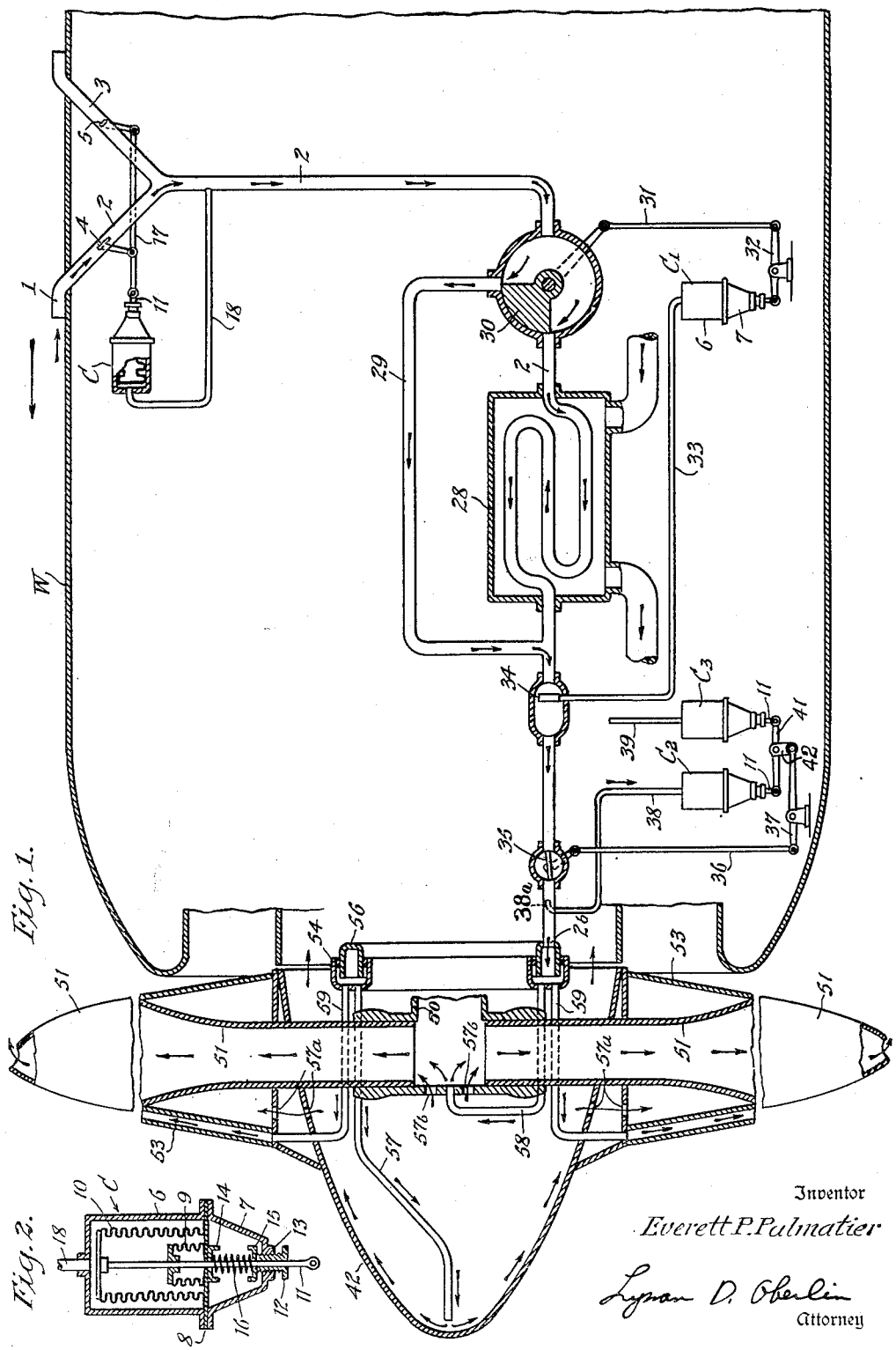

2,551,697

UNITED STATES PATENT OFFICE 2,551,697

SYSTEM FOR SUPPLYING HEATED AIR FOR USE ON AIRCRAFT

Everett P. Palmatier, Solvay, N. Y., assignor to Curtiss-Wright Corporation, a corporation of Delaware Original application September 20, 1943, Serial No. 503,143. Divided and this application May 2, 1945, Serial No. 591,606

2 Claims. (Cl. 98—1.5)

My invention relates to systems for supplying heated air for use on aircraft.

My invention has reference to a system comprising a pipe through which a stream of air flows under pressure through a heat-exchange zone, said system further comprising a valve-controlled pipe which forms a by-pass around said zone.

My invention has further reference to a system comprising means for controlling a condition, for example, pressure of the stream of air, said system further comprising means responsive to different conditions of said stream of air for jointly actuating said control means.

My invention has further reference to a system comprising an air scoop for causing a stream of air to flow under pressure through a heat-exchange zone, said system further comprising means for varying a condition of said stream of air while passing toward the heat-exchange zone.

Various other objects, advantages and features of my invention will become apparent from the following detailed description.

My invention resides in the heat-exchange system, novel control features, arrangements and combinations of the character hereinafter described and claimed.

This application is a division of application Serial No. 503,143, filed September 20, 1943, now Patent No. 2,507,044 of May 9, 1950.

For an understanding of my invention and for an illustration of one of the forms thereof, reference is to be had to the accompanying drawings, in which:

Figure 1 is a schematic view showing the supply system of my invention; and

Fig. 2 is a sectional view illustrating a control mechanism included in my novel system.

Referring to Fig. 1, I have shown an aircraft surface W which, for example, may be the forward surface of a wing. Projecting in the normal direction of aircraft flight is an air scoop 1 adapted to supply air to a pipe 2 having branching therefrom an upwardly extending pipe 3 which terminates above the surface W at the rear of the air scoop 1. Disposed in the pipes 2 and 3 are the respective valves 4 and 5 which are operated by control mechanism C of the character shown in Fig. 2.

The control mechanism C may be of any suitable character and, as illustrated, it comprises a pair of housings 6, 7 secured to each other in flanged relation and separated from each other by a plate 8. Secured to the plate 8 are the inner and outer bellows 9 and 10 forming sealed chambers, respectively, and having a depending rod 11 secured to the upper plate of each, said rod 11 being slidably mounted in and with respect to the aforesaid plate 8 and also with respect to a nut 12 which is threaded through a member 13 secured to and closing the lower surface of the housing 7. Within said housing 7, the rod 11 has secured thereto a disk 14 which faces a similar disk 15 mounted on the nut 12. The rod 11 is slidable with respect to the disk 15 and, confined between the two disks 14 and 15, is a helical spring 16 which biases the rod 11 in an upward direction.

As shown in Fig. 1, the rod 11 of the control mechanism C has connected thereto a member 17 to which each of the valves 4 and 5 is connected. Communicating with the chamber defined by the exterior surface of the bellows 10 and the interior surface of the housing 6 is a pipe 18 which communicates with the aforesaid pipe 2 beyond the junction thereof with the pipe 3. Accordingly, operation of the valves 4 and 5 is responsive to the pressure of the air passing through the pipe 2 downstream of its juncture with the pipe 3, and this air is controlled to constant pressure.

The pipe 2 extends through a suitable heating zone exemplified, in the example shown, but not necessarily, by a housing 28 having inlet and outlet ports traversed by the hot exhaust gases from the aircraft engine, convolutions of the pipe 2 being suitably arranged in said housing 28.

A pipe 29 communicates with the pipe 2 adjacent the entrance side of the heat-exchange zone. This pipe 29 by-passes said heat-exchange zone and is disposed in communicating relation with the pipe 2 adjacent the exit side of the heat-exchange zone. Disposed at the juncture of the pipes 2 and 29, at the entrance side of the heat-exchange zone, is a valve 30 adapted to be actuated by a link 31 pivoted to the lever 32 of a control mechanism C1 which is a duplicate of the control mechanism illustrated in Fig. 2. As regards the control mechanism C1, a pipe 33 replaces the pipe 18 of the control mechanism C, said pipe 33 terminating in a thermal bulb 34 disposed in the pipe 2 beyond the junction thereof with the discharge end of the pipe 29, the bulb 34, the pipe 33 and the space in the associated housing 6 exteriorly of the outer bellows 10 being filled with a suitable control medium, either vapor, liquid or a gas. Thus the control mechanism C1 in conjunction with the valve 30 maintains the mixed air from the pipes 2 and 29, downstream of the heat exchanger 28, at constant temperature.

The pipe 2, adjacent the discharge end thereof, has disposed therein a valve 35 which is controlled by the quantity of air traversing the pipe 2. Accordingly, the valve 35 has connected thereto a link 36 which is pivoted to a suitably supported lever 37 controlled by a pair of control mechanisms C2 and C3 of the character illustrated in Fig. 2. As regards the control mechanism C2, a pipe 38 replaces the pipe 18 of the control mechanism C, said pipe 38 terminating in an angular section 38a disposed in a section of the pipe 2 beyond the junction thereof with the discharge end of the pipe 29 and downstream of the valve 35. This angular pipe section 38a faces the stream of oncoming air and said pipe 38 communicates with the chamber defined by the exterior surface of the associated bellows 10 and the interior surface of the associated housing 6. Hence, the rod 11 of the control mechanism C2 varies in position in accordance with the quantity of the air passing through the pipe 2, and the control mechanism C2 operates to move the valve 35 to maintain constant flow of air.

As regards the control mechanism C3, a pipe 39 replaces the pipe 18 of the control mechanism C, said pipe 39 opening to the ambient air. The pipe 39 and the space in the associated housing 6 exteriorly of the outer bellows 10 are in communication, the interior of the bellows being evacuated or containing a fixed quantity of elastic fluid to provide an altitude or air density compensation. Hence, the rod 11 of the control mechanism C3 varies in position in accordance with the atmospheric pressure.

The rods 11 of the pair of control mechanisms C2 and C3 are pivoted, respectively, to the opposite ends of a lever 41 which by a link 42, is pivoted to the lever 37. Accordingly, the lever 37, link 36 and the valve 35 take a position which is dependent jointly upon the pressure of the ambient air and the quantity of air passing through a section of the pipe 2 beyond the juncture thereof with the aforesaid pipe 29.

As regards the form of my invention herein disclosed, the control mechanism C for the valves 4 and 5 holds these valves in such respective positions that the intake pressure of the air passing through the pipe 2 beyond the junction thereof with the pipe 3 has a desired value. In case this intake pressure becomes too high, the control mechanism C operates to move the valve 4 to a more closed position and the valve 5 to a more open position. Should such intake pressure become too low, an operation the reverse of that described is effected on the valves 4 and 5.

The control mechanism C1 for the valve 30 is operated in accordance with the temperature of the air passing through that section of the pipe 2 beyond the heat-exchange zone. In case the temperature of the air passing through said last named pipe section becomes too high, the control mechanism C1 moves the valve 30 to such position that more of the air by-passes the heat-exchange zone by way of the pipe 29. Should the temperature of the air in said last named pipe section become too low, an operation is performed the reverse of that described whereby the pipe 29 is throttled to cause more air to pass through the heat-exchange zone.

As hereinbefore stated, the position of the valve 35 is determined jointly by the quantity of air passing through that section of the pipe 2 beyond the junction thereof with the pipe 29 and also by the ambient air pressure.

The heated air emerging from the outlet end of the pipe 2 may be utilized for any suitable purpose on the aircraft as desired. For example, this stream of heated air may be utilized to heat any selected aircraft surface to prevent the formation of ice thereon or to melt ice which has already been formed thereon.

As illustrative of some uses of the stream of heated air, reference is to be had to Fig. 1 which, in a diagrammatic manner, shows a propeller hub 50 having angularly related sockets for the reception of the respective propeller blades 51. Associated with the hub 50 is a spinner 42 and, exteriorly thereof, cuffs 53 are disposed around the respective blades 51. The parts thus described are rotatable together as a unit. Suitably secured to these rotatable parts is an annular housing 54 maintained in sealed relation as at 55 with a second annular housing 56 suitably secured in fixed position with respect to the rotatable housing 54.

As shown, the outlet end 2b of the pipe 2 communicates with and discharges a main stream of heated air into the sealed chamber defined by the housings 54 and 56. Secured to the housing 54 for rotatable movement therewith and communicating with said chamber are four pipes 57, 58 and 59, 59 traversed, respectively, by secondary of streams of heated air. The pipe 57 passes heated air into the spinner 42 and, particularly, into engagement with the interior surface of said spinner 42 from which such heated air may pass into heat-transferring relation with the blade cuffs 53 by way of the respective passages 57a and, further, heated air from the spinner 52 may pass into the hollow blades 51 by way of passages 57b. The pipe 58 terminates interiorly of the hub 50 and conveys heated air into the space defined thereby, such heated air thereafter passing outwardly into and through the interior chambers defined by the respective propeller blades 51 each of which comprises an air-discharge passage at or near the end thereof. The pipes 59 are bent angularly and communicate with the respective chambers formed at the leading edges of the cuffs 53, to which they convey heated air from the chamber 55, 56.

From the foregoing description, it will be understood that the flow of air through the pipe 2 is established and maintained in response to movement of the aircraft through the air. Obviously, a pump, or equivalent, may be utilized for effecting such passage of air through the pipe 2 and, if desired, it will be understood that the pump may be utilized booster-fashion to increase the flow of air through said pipe 2.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent, is:

1. A system for obtaining a supply of heated air on an aircraft, said system comprising a pipe, an air scoop connected with said pipe for causing a stream of air to flow therethrough under pressure, a second pipe branching from said first pipe and terminating in a section facing from said air scoop, a valve in each of said pipes, and control mechanism responsive to pressure downstream of the valves for actuating said valves in unison to maintain substantially constant pressure in said pipe.

2. A system for obtaining a supply of heated air on an aircraft, said system comprising a pipe, an air scoop connected with said pipe for causing a stream of air to flow therethrough under pressure, a second pipe branching from said first pipe and terminating in a section facing from said air scoop, a valve in each of said pipes, and pressure-responsive control mechanism for jointly actuating said valves responsive in its operative to the air pressure downstream of said valves.

EVERETT P. PALMATIER.

REFERENCES CITED

The following references are of record in the file of this patent:

UNITED STATES PATENTS

| Number | Name | Date |
|---|---|---|
| 2,262,003 | Huffman et al. | Nov. 11, 1941 |
| 2,310,941 | Dewey | Feb. 16, 1943 |
| 2,316,237 | Grunert et al. | Apr. 13, 1943 |
| 2,353,201 | Talbot | July 11, 1944 |
| 2,388,970 | Hess et al. | Nov. 13, 1945 |
| 2,403,186 | Leslie | July 2, 1946 |
| 2,428,078 | Heymann | Sept. 30, 1947 |

FOREIGN PATENTS

| Number | Country | Date |
|---|---|---|
| 458,350 | Great Britain | Dec. 17, 1936 |